April 24, 1951 J. L. ASHMAN 2,549,753
INSTRUMENT PANEL CLAMPING BRACKET FOR ADJUSTING
AUTOMOBILE TRAYS
Filed April 16, 1949
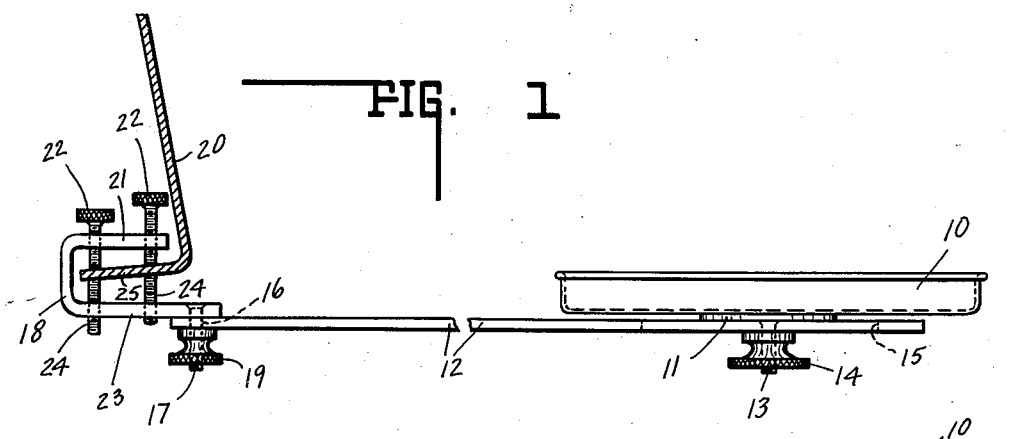
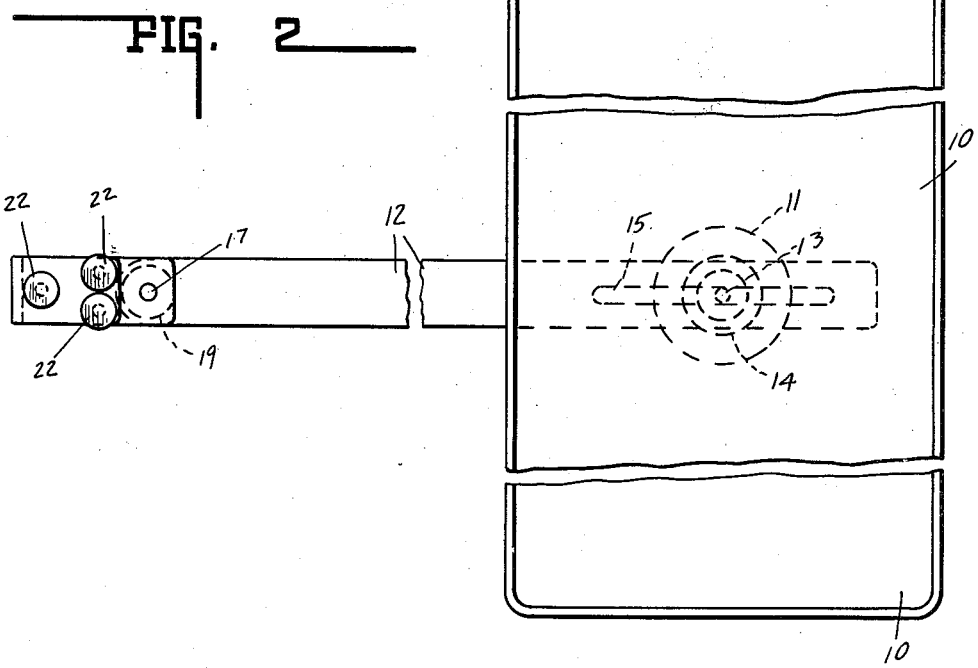
INVENTOR.
JOSEPH L. ASHMAN,
BY
Lockwood, Goldsmith & Galt,
ATTORNEYS.

Patented Apr. 24, 1951

2,549,753

UNITED STATES PATENT OFFICE 2,549,753

INSTRUMENT PANEL CLAMPING BRACKET FOR ADJUSTING AUTOMOBILE TRAYS

Joseph L. Ashman, Indianapolis, Ind.

Application April 16, 1949, Serial No. 87,921

2 Claims. (Cl. 311—21)

This invention relates to an adjustable tray for use particularly with automobiles. It is, however, adapted for use in any environment where it may be found practicable.

It is the primary object of this invention to provide a tray which may be secured to the instrument panel of an automobile or the like and which may be pivoted or swung from a use to non use position with ease. In the latter position it is located under the panel where it will be out of the way of the automobile occupants.

It is a further object of this invention to provide an adjustable tray for use in supporting food and drink containers, particularly those received at a so-called "curb-service" restaurant. It will be recognized that there are other uses to which the invention can be put. For example, it can be used as a compact or cosmetic tray when desired.

It is a still further object of this invention to provide a clamping member for the tray, which is of such character that it is possible to level the tray regardless of the way the instrument panel flange or lip is sloped. It is common knowledge that the instrument panels of various models of automobiles have inwardly directed flanges which are of different contours. Some are inclined downwardly, some are horizontally disposed and others are inclined upwardly. Furthermore, in some models there are nuts, projections, sub-flanges or various other obstructions on the upper face secured to such flanges. The problems of securing a tray to the flange so that the tray itself will be level or horizontally disposed are obvious. By reason of applicant's construction it is possible to retain the tray at all times in the horizontal level position.

The chief feature of the present invention resides in the provision of a clamping member for so connecting the tray support arm to the instrument panel that the tray itself will always be supported in a level, horizontal position. This feature is of particular value for the reason that the inturned lips of automobile instrument panels vary in their angular pitch. Some are horizontal but many extend downwardly. With the present invention it is possible to adjust the tray support arm clamping member, so that regardless of the pitch of the inturned lip, the tray will be maintained in a level position.

The full nature of the invention will be understood from the accompanying drawings and the following description and claims.

Fig. 1 is a side elevation view of the invention with the instrument panel shown in section.

Fig. 2 is a top plan view thereof with parts broken away.

In the drawings, 10 shows the tray which has a spacing member 11 formed on its under surface to separate the bottom of the tray and the tray support arm 12. Depending from the spacing member is the stud 13 which is externally threaded on its free end to receive and accommodate the knurled headed clamp nut 14.

Formed longitudinally in the support arm adjacent its free end is the slot 15 through which the stud extends and along which it is movable when the clamp nut is loosened.

By reason of this construction the tray is capable of being pivoted to any desired horizontal position, and of being moved to or fro along the slot.

Adjacent the opposite end of the support arm there is formed the aperture 16 through which extends the stud 17. This stud depends from adjacent the lower end of the substantially J-shaped bracket 18 and is externally threaded to receive the knurled headed clamp nut 19. With this arrangement the support arm is pivotally secured to the bracket and the entire tray construction may be swung arcuately either to the right or the left to a position under the instrument panel 20 where it will be out of the way.

The bracket 18 has preferably three or more spaced apertures formed through its upper arm 21, they being internally threaded to accommodate the knurl headed clamp screws 22. The lower arm 23 of the bracket has spaced, internally threaded apertures formed therethrough to receive the headless set screws 24. At least two such set screws are provided as shown, although three triangularly spaced screws may be used if desired.

In the drawings, the instrument panel is shown with a downwardly and inwardly turned lip 25. When mounting the invention, the J-shaped bracket is placed in a position under the panel so that it straddles the lip. While the lower arm of the bracket is held in a horizontal position, the clamp screws are screwed into contact with the upper face of the lip. Then the set screws are similarly turned until their free ends engage the lower face thereof. Next the support arm is pivotally secured to the bracket, after which the tray may be pivotally secured to the support arm. The tray is then ready for convenient use.

While the invention has been illustrated and described in its preferred embodiment in the drawings and foregoing description, the same is to be considered as illustrative and not restrictive in character.

The invention claimed is:

1. In an adjustable automobile tray for instrument panels terminating in an inwardly directed flange, clamping means connected to said tray, comprising a substantially J-shaped bracket adapted to straddle said flange, said bracket having three triangularly spaced interiorly threaded apertures formed in one arm thereof and at least one such aperture formed in the other arm thereof, and a clamping screw for each of said apertures operably engageable with said flange for leveling said bracket.

2. In an adjustable automobile tray for instrument panels terminating in an inwardly directed flange, clamping means connected to said tray for retaining it in a horizontal relation, comprising a substantially J-shaped bracket adapted to straddle said flange, said bracket having at least one interiorly threaded aperture formed in its upper arm and three triangularly spaced interiorly threaded apertures formed in its lower arm, and a clamping screw for each aperture, said screws each being independently adjustable into clamping engagement with said flange for retaining said bracket and said tray in horizontal relation.

JOSEPH L. ASHMAN.

REFERENCES CITED

The following references are of record in the file of this patent:

UNITED STATES PATENTS

| Number | Name | Date |
|---|---|---|
| 1,360,180 | Congdon | Nov. 23, 1920 |
| 1,486,364 | Champman | Mar. 11, 1924 |
| 1,679,715 | Fish | Aug. 7, 1928 |
| 1,801,637 | Nichols | Apr. 21, 1931 |
| 1,862,661 | Cohen | June 14, 1932 |
| 2,112,669 | Halas | Mar. 29, 1938 |
| 2,454,889 | Shelton et al. | Nov. 30, 1948 |
| 2,456,220 | Shelton et al. | Dec. 14, 1948 |
| 2,480,304 | Pelton | Aug. 30, 1949 |
| 2,510,436 | Trammell | June 6, 1950 |